United States Patent
Hasemann

(10) Patent No.: US 7,416,593 B2
(45) Date of Patent: Aug. 26, 2008

(54) MONO AZO DYES

(75) Inventor: Ludwig Hasemann, Müllheim-Niederweiler (DE)

(73) Assignee: Clariant Finance (BVI) Limited, Tortola (VG)

( * ) Notice: Subject to any disclaimer, the term of this patent is extended or adjusted under 35 U.S.C. 154(b) by 0 days.

(21) Appl. No.: 10/535,075

(22) PCT Filed: Nov. 11, 2003

(86) PCT No.: PCT/IB03/05096

§ 371 (c)(1),
(2), (4) Date: May 13, 2005

(87) PCT Pub. No.: WO2004/044057

PCT Pub. Date: May 27, 2004

(65) Prior Publication Data

US 2006/0101595 A1    May 18, 2006

(30) Foreign Application Priority Data

Nov. 13, 2002 (GB) ................... 0226448.9
Nov. 29, 2002 (EP) ................... 02026651

(51) Int. Cl.
C09D 11/00 (2006.01)
C09B 29/00 (2006.01)

(52) U.S. Cl. .......................... 106/31.5; 534/765; 8/684; 8/682

(58) Field of Classification Search ................ 106/31.5; 534/765; 8/684, 682; 427/466; 428/195.1
See application file for complete search history.

(56) References Cited

U.S. PATENT DOCUMENTS

| | | | | |
|---|---|---|---|---|
| 3,321,266 A | * | 5/1967 | Schwarz et al. ............ | 8/686 |
| 4,113,732 A | | 9/1978 | Opgenorth et al. | |
| 4,308,542 A | | 12/1981 | Maekawa et al. | |
| 4,363,913 A | | 12/1982 | Clark et al. | |
| 4,626,284 A | | 12/1986 | Ohta et al. | |
| 4,675,161 A | * | 6/1987 | Hashimoto et al. ......... | 422/56 |
| 4,703,113 A | | 10/1987 | Baxter et al. | |
| 4,935,307 A | | 6/1990 | Iqbal et al. | |
| 4,956,230 A | | 9/1990 | Edwards et al. | |
| 4,963,189 A | | 10/1990 | Hindagolla | |
| 4,981,837 A | * | 1/1991 | Tanaka et al. ............. | 503/227 |
| 5,062,892 A | | 11/1991 | Halko | |
| 5,134,198 A | | 7/1992 | Stofko, Jr. et al. | |
| 5,219,928 A | | 6/1993 | Stofko, Jr. et al. | |
| 5,756,212 A | | 5/1998 | Liebler et al. | |
| 5,853,540 A | | 12/1998 | Niemoller et al. | |
| 6,096,418 A | | 8/2000 | Sato et al. | |
| 6,582,502 B2 | * | 6/2003 | Fujiwara ................. | 106/31.48 |
| 6,855,195 B2 | * | 2/2005 | Nishita et al. ............ | 106/31.48 |
| 6,939,399 B2 | * | 9/2005 | Yabuki .................... | 106/31.27 |
| 2003/0089274 A1 | * | 5/2003 | Nishita et al. ............ | 106/31.48 |
| 2004/0187735 A1 | * | 9/2004 | Taguchi et al. ........... | 106/31.27 |

FOREIGN PATENT DOCUMENTS

| | | | |
|---|---|---|---|
| CH | 584 747 A5 | | 2/1977 |
| CH | 584747 | * | 2/1977 |
| DE | 30 18 342 A1 | | 11/1980 |
| DE | 34 33 957 A1 | | 3/1986 |
| DE | 3433957 | * | 3/1986 |
| DE | 44 46 551 A1 | | 3/1996 |
| EP | 0 164 196 A1 | | 12/1985 |
| EP | 0 331 170 A2 | | 9/1989 |
| EP | 0331170 | * | 9/1989 |
| EP | 0 425 150 A2 | | 5/1991 |
| EP | 0 755 332 | | 1/1997 |
| EP | 0 875 393 A1 | | 11/1998 |
| FR | 2 387 267 A | | 11/1978 |
| GB | 1 413 315 A | | 11/1974 |
| GB | 1 594 002 | | 7/1981 |
| GB | 1 597 959 | | 9/1981 |
| JP | 2002/309117 | * | 10/2002 |
| WO | WO 95/28284 A1 | | 10/1995 |

OTHER PUBLICATIONS

Derwent abstract of DE 3433957, Mar. 1986.*
Derwent abstract of JP2002/309117, Oct. 2002.*
Derwent abstract of CH 584747, Feb. 1977.*
English abstract for CH 584 747 A5, Feb. 15, 1997.
English abstract for DE 34 33 957 A1, Mar. 27, 1986.
English abstract for FR 2 387 267 A, Nov. 10, 1978.
English abstract and machine translation for JP 2002/309117, Oct. 23, 2002.
P. Gregory "Topics in Applied Chemistry: High Technology Applications of Organic Colorants" Plenum Press, New York 1991, p. 15-25, no month available.
Ink-Jet-Printing section of R.W. Kenyon in "Chemistry and Technology of Printing and Imaging Systems", Peter Gregory (editor), Blackie Academic & Professional, Chapmann & Hall 1996, pp. 113-138, no month available.
PCT Search Report for PCT/IB 03/05096, dated Feb. 13, 2004.
PCT International Preliminary Examination Report for PCT/IB 03/05096, dated Nov. 25, 2004.

* cited by examiner

Primary Examiner—Helene Klemanski
(74) Attorney, Agent, or Firm—Tod A. Waldrop

(57) ABSTRACT

The invention relates to novel azo dyestuffs of formula (I), the use of such compounds and/or mixtures for printing recording materials, especially paper or papery substrates, textile fiber materials, plastic films and plastic transparencies by the inkjet printing process and also to the recording materials printed thereby

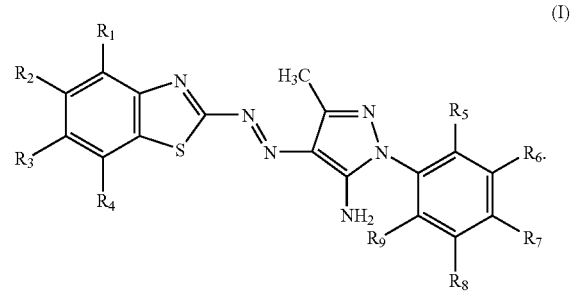

9 Claims, No Drawings

MONO AZO DYES

The invention relates to novel dyestuff and mixtures thereof, the use of such compounds and/or mixtures for printing recording materials, especially paper or papery substrates, textile fibre materials, plastic films and plastic transparencies by the inkjet printing process and also to the recording materials printed thereby.

Inkjet printing processes are becoming more and more important for industrial applications.

Inkjet printing processes are known. In what follows, the principle of inkjet printing will only be discussed very briefly. Details of this technology are described for example in the Ink-Jet-Printing section of R. W. Kenyon in "Chemistry and Technology of Printing and Imaging Systems", Peter Gregory (editor), Blackie Academic & Professional, Chapmann & Hall 1996, pages 113–138, and references cited therein.

In the inkjet printing process, individual droplets of the ink are sprayed from a nozzle onto a substrate in a controlled manner. The continuous inkjet method and the drop-on-demand method are employed predominantly for this purpose. In the case of the continuous inkjet method, the droplets are produced continuously and droplets not needed for printing are diverted into a collecting vessel and recycled. In the case of the discontinuous drop-on-demand method, by contrast, droplets are generated and printed as desired, i.e. droplets are only generated when this is necessary for printing. The droplets may be generated for example by means of a piezo inkjet head or by means of thermal energy (bubble jet).

By additionally disposing at least one nozzle with yellow, magenta or cyan ink side by side it is possible to obtain colour reproductions in high quality. This process is known as polychromatic printing or, when three colour components are used, as trichromatic printing.

The composition of the invention can be used with all known and suitable inkjet printers for printing paper or papery substrates, textile fibre materials, plastic films and plastic transparencies. This applies not only to the use in monochromatic printing but also to polychromatic printing, especially trichromatic printing.

The composition of the ink for the inkjet printing process has to possess a suitable conductivity, sterility in storage, viscosity and surface tension to meet the specific requirements of inkjet ink. In addition, the prints on the recording materials have to have good properties and fastness. Of a major importance is the fastness against ozone when applied to paper especially when applied onto micro porous paper.

Useful recording materials, as mentioned above, are preferably paper and papery substrates, textile fibre materials, plastic films and plastic transparencies. But glass and metal may be used as well.

Useful papers or papery substrates include all known such materials. Preference is given to papers or papery substrates coated on at least one side with a material which is particularly receptive to ink compositions. Such papers or papery materials are described inter alia in DE 3018342, DE 4446551, EP 164196 and EP 875393.

Useful textile fibre materials are in particular hydroxyl-containing fibre materials. Preference is given to cellulosic fibre materials, which consist of or comprise cellulose. Examples are natural fibre materials such as cotton, linen or hemp and regenerated fibre materials such as, for example, viscose and also lyocell.

Useful plastic films or plastic transparencies include all known such materials. Preference is given to plastic films or plastic transparencies coated on at least one side with a material which is particularly receptive to the ink compositions.

Such plastic films or plastic transparencies are described inter alia in EP 755332, U.S. Pat. Nos. 4,935,307, 4,956,230, 5,134,198 and 5,219,928.

Disperse benzothiazole azo dyes are known from DE3433957 and JP2002309117 teaching always halogen substituted benzothiazole derivatives used as diazo components and various coupling components. EP331170 discloses dyes which sublime easily. However, there is still a need to improve the properties of dyes and provide dyes with adapted properties meeting the requirement as set forth above.

This invention provides dyestuff according to the formula (I)

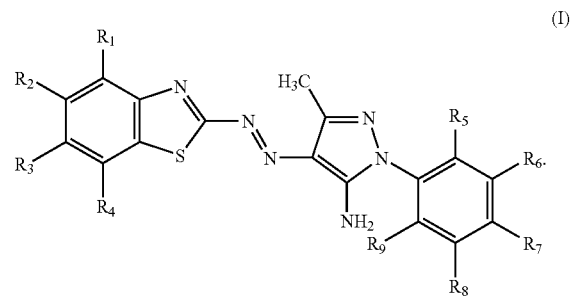

wherein $R_1, R_2, R_3, R_4$, independently from each other signifies H, Cl, Br, F, $SO_3H$, $SO_2R$, $SO_2NR'R''$, COOR, COOH, OH, alkyl, aryl, alkoxy, $NCOCH_3$, or NR'R'', or two neighbouring substituents $R_1, R_2, R_3,$ or $R_4$ form together a ring which is annealed to the benzthiazole moiety and can be unsubstituted or substituted by $SO_3H$;

$R_5, R_6, R_7, R_8, R_9$ independently from each other signifies H, Cl, Br, F, Alkyl, Aryl, Alkoxy, $SO_3H$, $SO_2R$, NR'R'', or two neighbouring substituents $R_5, R_6, R_7, R_8$ or $R_9$ form together a ring which is annealed to the phenyl moiety and can be unsubstituted or substituted by $SO_3H$;

R is H, alkyl or aryl group which may be substituted or unsubstituted or R' and R'' are independently from each other H, alkyl or alkoxy or aryl groups which may be substituted or unsubtituted;

with the proviso that at least one of the substituents $R_5, R_6, R_7, R_8, R_9$ is different from H;

as well as their salts and/or mixtures thereof.

Preferred dyestuff according to the invention have the formula (I')

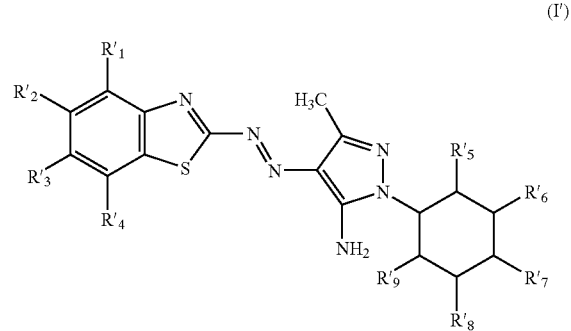

wherein

R'$_1$, R'$_2$, R'$_3$, R'$_4$, independently from each other signifies H, SO$_3$H, SO$_2$R, SO$_2$NR'R", COOR, COOH, alkyl, alkoxy, NCOCH$_3$, or NR'R", or two neighbouring substituents R'$_1$, R'$_2$, R'$_3$, or R'$_4$ form together a ring which is annealed to the benzthiazole moiety and can be unsubstituted or substituted by SO$_3$H and wherein at least two of the substituents R'$_1$, R'$_2$, R'$_3$ or R'$_4$ signify H;

R'$_5$, R'$_6$, R'$_7$, R'$_8$, R'$_9$ independently from each other signifies H, Alkyl, Aryl, methoxy or ethoxy, SO$_3$H, SO$_2$CH$_2$CH$_2$—OH, NR'R", or two neighbouring substituents R$_5$, R$_6$, R$_7$, R$_8$ or R$_9$ form together a ring which is annealed to the phenyl moiety and can be unsubstituted or substituted by SO$_3$H; and wherein at least two of the R'$_5$, R'$_6$, R'$_7$, R'$_8$ or R'$_9$ signify H;

with R, R' and R" as defined above;

with the proviso that at least one of the substituents R'$_5$, R'$_6$, R'$_7$, R'$_8$, R'$_9$ is different from H;

as well as their salts and/or mixtures thereof.

In further preferred compounds according to formula (I) or (I') R$_9$ or R'$_9$ siginfies H. In further preferred compounds the at least one of the substituents R'$_5$, R'$_6$, R'$_7$, R'$_8$, R'$_9$ which is different from H is SO$_3$H.

More preferred dyestuff according to the invention have the the formula (I")

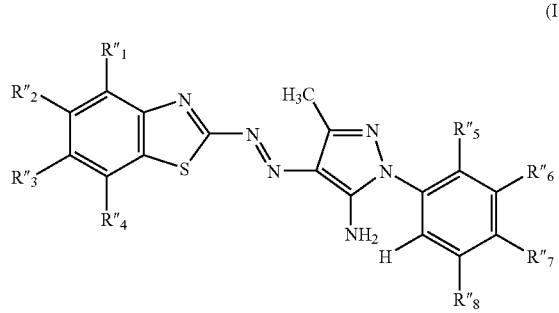

(I")

wherein

R"$_1$, R"$_2$, R"$_3$, R"$_4$, independently from each other signifies H, SO$_3$H, SO$_2$CH$_2$CH$_2$—$_{OH}$, $_{SO2}$NH$_2$, SO$_2$N(CH$_3$)$_2$, COOH, COOCH$_3$, COOCH$_2$CH$_3$, CH$_3$, CH$_2$CH$_3$, OCH$_2$CH$_2$OH, NCOCH$_3$, N(CH$_3$)$_2$ or NH$_2$, or two neighbouring substituents R"$_1$, R"$_2$, R"$_3$, or R"$_4$ form together a six membered ring which is annealed to the benzthiazole moiety and can be unsubstituted or substituted by SO$_3$H and wherein at least two of the substituents R"$_1$, R"$_2$, R"$_3$ or R"$_4$ signify H;

R"$_5$, R"$_6$, R"$_7$, R"$_8$, R"$_9$ independently from each other signifies H, methyl, ethyl, aryl, methoxy or ethoxy, SO$_3$H, SO$_2$CH$_2$CH$_2$—OH, NH$_2$, or two neighbouring substituents R$_5$, R$_6$, R$_7$, R$_8$ or R$_9$ form together a six membered ring which is annealed to the phenyl moiety and can be unsubstituted or substituted by SO$_3$H; and wherein at least one of the R"$_5$, R"$_6$, R"$_7$ or R"$_8$ signifies H;

with the proviso that at least one of the substituents R"$_5$, R"$_6$, R"$_7$, R"$_8$, R"$_9$ is different from H;

as well as their salts and/or mixtures thereof.

The preferred six membered ring which is annealed to the phenyl have the formula

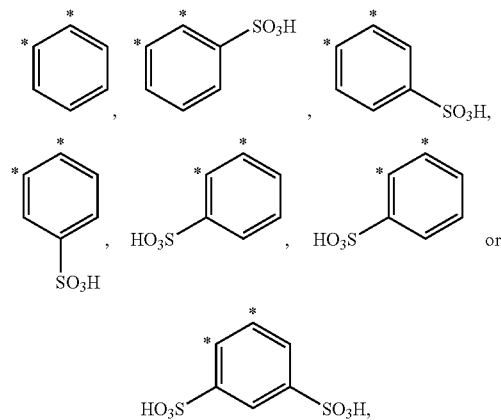

wherein the asterix signify the point of attachement to the phenyl.

By preference the more preferred compound according to formula (I), (I') or (I") bear at least one solubilising group. Most preferred compound according to formula (I), (I') or (I") bear at least two solubilising groups. By preference at least one of the solubilising groups is located in the coupling component, which means that at least one of the substituents R$_5$, R$_6$, R$_7$, R$_8$, R$_9$ or R'$_5$, R'$_6$, R'$_7$, R'$_8$, R'$_9$ or R"$_5$, R"$_6$, R"$_7$, R"$_8$, R"$_9$ respectively signifies a solubilising group or in the case where two neighbouring substituents R$_5$, R$_6$, R$_7$, R$_8$ or R$_9$ form together a ring which is annealed to the phenyl moiety these annealed rings are at least substituted by a solubilising group which is either located on the original phenyl ring or which is located in the newly formed ring by the two neighbouring substituents R$_5$, R$_6$, R$_7$, R$_8$ or R$_9$ or R'$_5$, R'$_6$, R'$_7$, R'$_8$, R'$_9$ or R"$_5$, R"$_6$, R"$_7$, R"$_8$, R"$_9$ respectively. By preference such solubilising groups are selected from the group of sulpho, carboxy and hydroxyethylsulfonyl (—SO$_2$CH$_2$CH$_2$OH) groups. The preferred solubilising groups are sulpho groups.

Alkyl and alkoxy groups referred to above are preferably radicals with up to 8 carbon atoms, more preferably up to 4 carbon atoms, e.g., butyl and more preferably 1 or 2 carbon atoms; substituents thereon may be halogen, hydroxy, cyano, alkoxy, acyl, acyloxy or acylamino. Those alkyl or alkoxy groups having 3 or more carbon atoms may be straight-chain, branched or cyclic, for example, cyclohexyl.

The invention provides in another of its aspects a process for the production of the dyestuffs according to the formula I wherein a diazotised amine of formula II

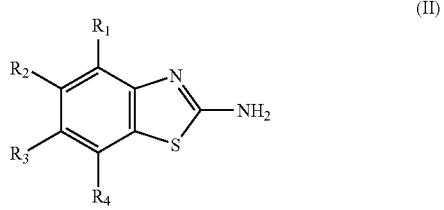

(II)

is coupled with a compound of formula III:

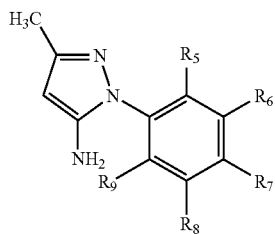

(III)

The compounds of formulae II and III are known starting materials, although they may also be readily synthesised from commonly available reagents via known syntheses. Diazotisation and coupling are effected in the usual manner. Preferably the amine II is diazotised at a temperature of from 0° C. to 20° C. and at a pH of from 0 to 2, more preferably 0 to 1. The coupling reaction is preferably carried out at a temperature of from 0° C. to 40° C. and at a pH of from 0 to 7, more preferably 0 to 6.

Dyestuffs according to the formula (I) may be isolated from the reaction medium according to known methods, for example, by salting out with an alkali metal salt, filtering and drying optionally in vacuo at a slightly elevated temperature.

Depending upon the reaction and/or isolation conditions, the dyestuffs according to the formula (I) may be obtained as the free-acid, salt or mixed salt form, containing, for example, one or more cations selected from the alkali metal cations, e.g., lithium ion, the sodium ion, or an ammonium ion or an alkylammonium cation, e.g., mono-, di-, or tri-methyl or ethylammonium cations or hydroxyalkyl ammonium cations, e.g. mono-, di-, or tri-hydroxyethyl ammonium cations. More preferred cations are ammonium ($NH_4^+$) or the triethanol ammonium cation or the lithium or natrium cation. The dyestuffs may be converted from the free-acid form to a salt or mixed salt form or vice-versa or from one salt form to another according to conventional techniques.

The compound may also be in a mixed salt. In a further preferred embodiment the dyestuff is in a mixed salt form wherein 80–100 weight % lithium cations and 0–20% sodium cation; in a more preferred embodiment the mixed salt form comprises 85 to 95% lithium cations and 5–15% sodium cations. In a further preferred embodiment the dyestuff is in a mixed salt form wherein 80–100 weight % triethanol ammonium cations and 0–20% sodium cation; in a more preferred embodiment the mixed salt form comprises 85 to 95% triethanol ammonium cations and 5–15% sodium cations.

The compounds of formula (I) may be converted into dyeing preparations. Processing into stable liquid, preferably aqueous, or solid (granulated or powder form) dyeing preparations may take place in a generally known manner.

A further embodiment of the invention relates to the use of the above mentioned compounds for the ink-jet printing process.

A further embodiment of the present invention relates to a inkjet printing composition for printing recording materials, preferably paper and papery substrates, textile fibre materials, plastic films and plastic transparencies, comprising
1) a mixture of dyestuffs as defined above and
2) water or a medium including a mixture of water and an organic solvent, an anhydrous organic solvent or a solid having a low melting point, The inkjet printing composition may optionally comprise further additives.

A further embodiment of the invention relates to the use of the above mentioned compositions for the ink-jet printing process.

The dyes of the formula (I) used in the inks should preferably be low in salt, i.e. have a total salt content of less than 0.5% by weight, based on the weight of the dyes. Dyes having higher salt contents (owing to their preparation and/or the subsequent addition of extenders) may be desalted, for example by means of membrane separation processes, such as ultrafiltration, reverse osmosis or dialysis.

The inks preferably include a total amount of dyes which is in the range from 0.5 to 35% by weight, preferably in the range from 1 to 35% by weight, more preferably in the range from 2 to 30% by weight, most preferably in the range from 2.5 to 20% by weight, based on the total weight of the ink.

The inks include 99.5–65% by weight, preferably 99–65% by weight, more preferably 98–70% by weight, most preferably 97.5–80% by weight, of an abovementioned medium 2), which includes a mixture of water and an organic solvent, an anhydrous organic solvent or a solid having a low melting point.

When the ink composition of the invention is used for printing paper or papery substrates, the inks are preferably used together with the following compositions. When the medium is a mixture of water and an organic solvent, the weight ratio of water to organic solvent is preferably in the range from 99:1 to 1:99, more preferably in the range from 99:1 to 50:50, particularly preferably in the range from 95:5 to 80:20.

It is preferable for the organic solvent, which is included in the mixture with water to be a water-soluble solvent or a mixture of various water-soluble solvents. Preferred water-soluble organic solvents are $C_{1-6}$-alcohols, preferably methanol, ethanol, n-propanol, isopropanol, n-butanol, sec-butanol, tert-butanol, n-pentanol, cyclopentanol and cyclohexanol; linear amides, preferably dimethylformamide, or dimethylacetamide; ketones and keto alcohols, preferably acetone, methyl ethyl ketone, cyclohexanone and diacetone alcohol; water-miscible ethers, preferably tetrahydrofuran and dioxane; diols, preferably diols possessing 2 to 12 carbon atoms, e.g. 1,5-pentanediol, ethylene glycol, propylene glycol, butylene glycol, pentylene glycol, hexylene glycol and thiodiglycol and oligo- and poly-alkylene glycols, preferably diethylene glycol, triethylene glycol, 1,2-propylenglycol, polyethylene glycol and polypropylene glycol; triols, preferably glycerol and 1,2,6-hexanetriol; mono-$C_{1-4}$-alkyl ethers of diols, preferably mono-$C_{1-4}$-alkyl ethers of diols possessing 2 to 12 carbon atoms, particularly preferably 2-methoxyethanol, 2-(2-methoxyethoxy)ethanol, 2-(2-ethoxyethoxy)ethanol, 2-[2-(2-methoxyethoxy) ethoxy]-ethanol, 2-[2-(2-ethoxyethoxy)ethoxy]ethanol, diethylenglycol-mono-n-butylether, ethylene glycol monoallyl ether and polyoxyethylenalkylether (for example Emulgen 66 of KAO Corp. (Emulgen is a trade mark of the Kao Corp.)); alkanolamines, preferably 2-diethylamine-1-ethanol, 3-dimethylamine-1-propanol, 3-diethylamine-1-propanol, 2-(2-aminoethoxy)ethanol, 2-(2-dimethylaminoethoxy)-ethanol, 2-(2-diethylaminoethoxy)ethanol, mono-, di-, triethanolamine, monoglycolamines and polyglycolamines, which may be obtained by reaction of ammonia, alkyl- or hydroxyalkylamines like methylamine, ethylamine, dimethylamine, diethylamine, mono-, di- and triethanolamines with alkyleneoxides for example ethylenoxide, 1,2-propylenoxide, 1,2-butylenoxide or 2,3-butylenoxide in suitable ratios as described in DE2061760A, preferably diethylenglycolamine, triethylenglycolamin, Bis-diethylenglycolamin, polyoxyethylen-(6)-triethanolamine, polyoxyethylen-(9)-triethanolamine, o-(2-aminoethyl)-polyethylenglycol 750, o,o-Bis-(2-aminopropyl)-polyethylenglycol 500, 800, 1900, 2000, o,o'-Bis-(3-aminopropyl)-polyethylenglycol 1500, cyclic amides, preferably 2-pyrrolidone, N-methyl-2-pyrrolidone, N-ethyl-2-pyrrolidone, N-(2-hydroxy)ethyl-2-pyrrolidone, caprolactam and 1,3-dimethylimidazolidone; cyclic esters, preferably caprolactone; sulphoxides, preferably dimethyl sulphoxide and sulpholane.

In a preferred composition, the medium as per 2) includes water and at least 2 or more, more preferably 2 to 8, water-soluble organic solvents.

Particularly preferred water-soluble solvents are cyclic amides, particularly 2-pyrrolidone, N-methyl-2-pyrrolidone and N-ethyl-2-pyrrolidone; N-(2-hydroxy)ethyl-2-pyrrolidone, $C_{1-6}$-alcohols, preferably n-propanol, cyclohexanol, diols, preferably 1,5-pentanediol, ethylene glycol, thiodiglycol, diethylene glycol, triethylene glycol and 1,2-propyleneglycol, triols, preferably glycerol; and mono-$C_{1-4}$-alkyl and $C_{1-4}$-alkyl ethers of diols, more preferably mono-$C_{1-4}$-alkyl ethers of diols possessing 2 to 12 carbon atoms, particularly preferably 2-[2-(2-methoxyethoxy)-ethoxy]-ethanol, diethylenglycol-mono-n-butylether, (for example Emulgen 66 of KAO Corp. (Emulgen is a trade mark of the Kao Corp.)), 2-diethylamine-1-ethanol, 3-dimethylamine-1-propanol, 3-diethylamine-1-propanol, 2-(2-diethylaminoethoxy)-ethanol, triethanolamine, diethylenglycolamin, polyglycolamines, preferably polyoyxethylen-(6)-triethanolamin, polyoxyethylen-(9)-triethanolamine, o-(2-aminoethyl)-polyethylen 750, o,o-bis-(2-aminopropyl)-polyethylen 500 and o,o-bis-(3-aminopropyl)-polyethylenglycol 1500.

A preferred medium as per 2) comprises
(a) 75 to 95 parts by weight of water and
(b) 25 to 5 parts of one or more of the watersoluble solvents.

wherein the parts are by weight and all parts of (a) and (b) add up to 100.

Examples of further useful ink compositions including water and one or more organic solvents are found in the Patent specifications U.S. Pat. Nos. 4,963,189, 4,703,113, 4,626,284 and EP 425150A.

When the medium as per 2) includes an anhydrous (i.e. less than 1% by weight of water) organic solvent, this solvent will have a boiling point of 30 to 200° C., more preferably of 40–150° C., particularly preferably of 50–125° C.

The organic solvent can be water-insoluble, water-soluble or mixtures of such solvents.

Preferred water-soluble organic solvents are all above-described water-soluble organic solvents and mixtures thereof.

Preferred water-insoluble solvents include inter alia aliphatic hydrocarbons; esters, preferably ethyl acetate; chlorinated hydrocarbons, preferably $CH_2Cl_2$; and ethers, preferably diethyl ether; and mixtures thereof.

When the liquid medium as per 2) includes a water-insoluble organic solvent, it is preferable to add a polar solvent to increase the solubility of the dye in the liquid medium.

Examples of such polar solvents are $C_{1-4}$-alcohols, preferably ethanol or propanol; ketones, preferably methyl ethyl ketone.

The anhydrous organic solvent can consist of a single solvent or a mixture of 2 or more different solvents.

When it is a mixture of different solvents, a mixture including 2 to 5 different anhydrous solvents is preferred. This makes it possible to provide a medium as per 2) which permits good control of the drying properties and of the stability of the ink composition in storage.

Ink compositions including an anhydrous organic solvent or mixtures thereof are of particular interest when rapid drying times are required and especially when they are used for prints on hydrophobic and non-absorbing substrates, such as plastic, metal and glass.

Preferred low-melting media have a melting point of 60 to 125° C. Useful low-melting solids include long-chain fatty acids or alcohols, preferably those having a $C_{18-24}$-carbon chain, and sulphonamides.

The ink composition of the invention may further include as auxiliaries additional components which are normally used in inkjet inks, for example viscosity improvers, surface tension improvers, biocides, corrosion inhibitors, levelling agents, drying agents, humefactants, ink penetration additives, light stabilizers, UV absorbers, optical brighteners, coagulation reducers, ionic or nonionic surfactants, conducting salts and pH buffers.

These auxiliaries are preferably added in an amount of 0–5% by weight.

To prevent precipitation in the ink compositions of the invention, the dyes used have to be purified clean. This can be done with commonly known purifying methods.

When printing textile fibre materials, useful additives, as well as the solvents, include water-soluble nonionic cellulose ethers or alginates.

The preferred material is paper. The paper may be plain or treated. Preference is given to ink compositions having a viscosity of 1 to 40 mPa·s, especially 5 to 40 mPa·s, preferably 10 to 40 mPa·s. Ink compositions having a viscosity of 10 to 35 mPa·s are particularly preferred.

Preference is given to ink compositions having a surface tension of 15–73 mN/m, especially 20–65 mN/m, particularly preferably 30–50 mN/m.

Preference is given to ink compositions having a conductivity of 0.1–100 mS/cm, especially 0.5–70 mS/cm, particularly preferably 1.0–60 mS/cm.

The inks may further include buffer substances, for example borax, borate or citrate. Examples are sodium borate, sodium tetraborate and sodium citrate.

They are used in particular in amounts of 0.1 to 3% by weight, preferably 0.1 to 1% by weight, based on the total weight of the ink, to set a pH of for example 5 to 9, especially 6 to 8. A citrate buffer is preferred in the case of alginatic inks.

The inks may further include customary additives, for example foam suppressants or especially fungal and/or bacterial growth inhibitors. These are customarily used in amounts of 0.01 to 1% by weight, based on the total weight of the ink.

The prints obtainable by the process of the invention have good general fastnesses, a good lightfastness and also sharp contours and a high colour strength. The inks provide prints of high optical density.

The printing inks used are notable for good stability and good viscosity properties. The recording fluids of the invention have viscosity and surface tension values which are within the ranges suitable for the ink-jet processes. The viscosity remains virtually unchanged even in the event of high shearing forces occurring during printing.

Recording fluids according to the invention in storage are not prone to the formation of precipitates that leads to fuzzy prints or nozzle cloggage.

A further aspect of the present invention is the use of the printing ink in trichromatic printing. Trichromatic printing is a very large application for all recording materials. This form of printing is normally carried out with a yellow, red and blue ink composition. Furthermore, the yellow dye formulations or compositions of the invention may be used as an ink set in combination with black, magenta and/or cyan recording fluids.

The dyestuff, dye formulations or compositions according to the invention may be used for shading other dyestuff, dye formulations or compositions. While the dyestuff, dye formulations or compositions according to the invention itself may be blended with other compabibles dyestuff, dye formulations or compositions to achieve the desired shade. Instead of blending the dyestuff, dye formulations or compositions it is also possible to mix inks of different shades to achieve the desired colour.

For example the shading colorant may be selected (among others) from the group consisting of C.I. Pigment Yellow 1, 3, 12, 13, 14, 16, 17, 42, 53, 73, 74, 81, 83, 97, 102, 111, 120, 126, 127, 139, 147, 151, 154, 155, 173, 174, 175, 176, 180, 181, 184, 191, 192, 194, 196, 213, 214, C.I. Pigment Orange 5, 13, 34, 36, 38, 43, 62, 68, 70, 71, 72, 73, 74, C.I. Pigment Red 2, 3, 4, 5, 9, 12, 14, 38, 48:2, 48:3, 48:4, 52:2, 53:1, 57:1, 101, 112, 122, 144, 146, 147, 149, 168, 169, 170, 175, 176, 179, 181, 184, 185, 187, 188, 208, 209, 210, 214, 219, 242, 247, 253, 254, 256, 257, 262, 263, 266, 297, 254, 255, 272, C.I. Pigment Violet 19, 23, 32, C.I. Pigment Blue 15, 15:1, 15:2, 15:3, 15:4, 15:6, 16, 28, 56, 61, 60, 75, 80, C.I. Pigment Green 7, 8, 10, 17, 36, 50. The shading colorants are present in an amount of 0.001 to 5% by weight, preferably 0.01 to 1% by weight, based on the total weight of the dry dye mixture.

This invention further provides recording materials, which have been printed with a composition according to the invention.

Moreover, the dye formulations or compositions of the invention are useful as colorants in the electrophotographic toners and developers, for example one- and two-component powder toners, magnetic toners, liquid toners, polymerization toners and other specialty toners.

Typical toner binders are addition polymerization, polyaddition and polycondensation resins, such as styrene, styrene-acrylate, styrene-butadiene, acrylate, polyester, phenolic and epoxy resins, polysulfones, polyurethanes, individually or in combination, and also polyethylene and polypropylene, in or to which further ingredients, such as charge control agents, waxes or flow agents, may be present or added subsequently. Dye formulations or compositions according to the invention are further useful as colorants in powders and powder coating materials, especially triboelectrically or electrostatically sprayed powder coating materials, which are used to coat the surfaces of articles made for example of metal, wood, plastic, glass, ceramic, concrete, textile material, paper or rubber. Powder coating resins employed are typically epoxy resins, carboxyl- and hydroxyl-containing polyester resins, polyurethane resins and acrylic resins together with customary curing agents. Combinations of resins are also used. For instance, epoxy resins are frequently used in combination with carboxyl- and hydroxyl-containing polyester resins.

The dye formulations or compositions of the invention are also useful as colorants for color filters, for additive as well as subtractive color generation (P. Gregory "Topics in Applied Chemistry: High Technology Applications of Organic Colorants" Plenum Press, New York 1991, page 15–25), and also as colorants in electronic inks for electronic newspapers.

The examples hereinbelow illustrate the invention. Temperatures are in degrees Celsius; parts and percentages are by weight, unless otherwise stated.

EXAMPLE

Synthesis of 2-Amino-benzthiazole-5-sulfonic acid 218 g 2-amino-nitrobenzene-5-sulfonic acid were added to 1100 ml of a 1.0 Molar Sulphuric acid at 5° C. and diazotated. The resulting suspension was slowly added to a solution of 180 ml water, 152 g $NH_4SCN$ and 5 g $Cu(SCN)_2$ at 0 to 5° C. and stirred for additional 3 hours at room temperature. The reaction mixture was poured into a hot (90 to 95° C.) suspension of 1000 ml water, 500 g iron powder and 17 g of a 37% hydrochloric acid and the resulting suspension was stirred till the reduction was completed. The mixtures was brought to a pH of more than 9 and the iron slurry was filtered off. The product was precipitated by lowering the pH, filtered off, washed and dryed. This yields 200 g product (2-Amino-benzthiazole-5-sulfonic acid) as an press cake.

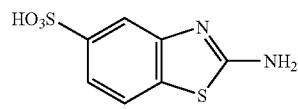

TABLE 1 substituted benzthiazoles-Nr. 1 to Nr. 22:
The following 2-aminobenzothiazoles were synthesized according to U.S. Pat. No. 4363913 by the oxidative ring closure of an arylthiourea which comprises contacting the arylthiourea with sulfuric acid and a catalytic amount of a bromine compound or by benzothiazoles from N-arylsubstituted thioureas by oxidative ring closure by the use of chlorine as oxidizing agent and by the presence of catalytic amounts of bromine according to U.S. Pat. No. 4113732 or by reducing 3-nitro-4-thiocyanobenzenesulphonic acid according to GB1594002 as shown above.

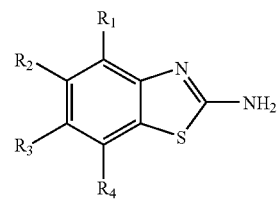

| benz-thiazole-Nr. | $R_1$ | $R_2$ | $R_3$ | $R_4$ |
|---|---|---|---|---|
| 1 | $SO_3H$ | H | H | H |
| 2 | $SO_3H$ | H | $CH_3$ | H |
| 3 | $SO_3H$ | H | $OCH_3$ | H |
| 4 | COOH | H | H | H |
| 5 | $OCH_3$ | H | H | H |
| 6 | H | $OCH_3$ | H | H |
| 7 | H | $SO_3H$ | H | H |
| 8 | H | $SO_3H$ | $OCH_3$ | H |
| 9 | H | $SO_2NH_2$ | H | H |
| 10 | H | H | $SO_3H$ | H |
| 11 | H | H | COOH | H |
| 12 | H | H | $COOCH_3$ | H |
| 13 | H | H | COCEt | H |
| 14 | H | H | $NH_2$ | H |
| 15 | H | H | *NH–C(=O)–CH₃ | H |
| 16 | H | H | $OCH_3$ | $SO_3H$ |
| 17 | H | H | *O–CH₂–CH₂–OH | H |

TABLE 1-continued substituted benzthiazoles-Nr. 1 to Nr. 22:
The following 2-aminobenzothiazoles were synthesized according to U.S. Pat. No. 4363913 by the oxidative ring closure of an arylthiourea which comprises contacting the arylthiourea with sulfuric acid and a catalytic amount of a bromine compound or by benzothiazoles from N-arylsubstituted thioureas by oxidative ring closure by the use of chlorine as oxidizing agent and by the presence of catalytic amounts of bromine according to U.S. Pat. No. 4113732 or by reducing 3-nitro-4-thiocyanobenzenesulphonic acid according to GB1594002 as shown above.

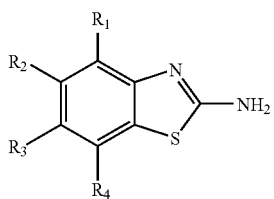

| benzthiazole-Nr. | $R_1$ | $R_2$ | $R_3$ | $R_4$ |
|---|---|---|---|---|
| 18 | H | H | *SO$_2$-CH$_2$CH$_2$-OH | H |
| 19 | H | H | *SO$_2$-N(CH$_3$)$_2$ | H |
| 20 | H | H | H | COOH |
| 21 | H | H | H | SO$_3$H |
| 22 | H | H | HO$_3$S-phenyl (3,4 positions marked*) |  |

EXAMPLE

Synthesis of 1-(3'-sulfophenyl)-3-methyl-5-aminopyrazol 173 g of methanilic acid were diazotazed at 0 to 5° C. and reduced by 269 g Sodium sulfite in the presence of 40 sodium hydrogencarbonate at 14 to 16° C. After this step the product was hydrolized by adding 330 g sulfuric acid (85%) at 75° C. The resulting hydrazine was filtered off and at pH 7 reacted with 82 g 3-Aminocrotonic nitrile. The product was precipitated by adding 350 g hydrochloric acid, filtered off, washed and dried which yields a press cake of 270 g of 1-(3'-sulfophenyl)-3-methyl-5-aminopyrazol.

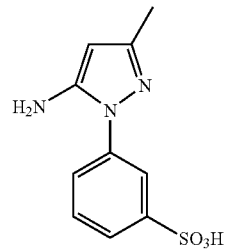

TABLE 2 substituted amino pyrazoles Nr. 1 to 20
The following amino pyrazoles were obtained in a similar manner as described above. If the phenyl moiety is substituted by a amino group, these derivatives were synthesized via the corresponding nitro derivatives.

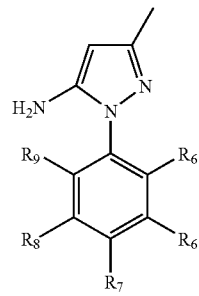

| amino pyrazoles Nr. | $R_5$ | $R_6$ | $R_7$ | $R_8$ | $R_9$ |
|---|---|---|---|---|---|
| 1 | SO$_3$H | H | H | H | H |
| 2 | CH$_3$ | H | SO$_3$H | H | H |
| 3 | SO$_3$H | H | H | SO$_3$H | H |
| 4 | H | SO$_3$H | H | H | H |

TABLE 2-continued substituted amino pyrazoles Nr. 1 to 20
The following amino pyrazoles were obtained in a similar manner as described above. If the phenyl moiety is substituted by a amino group, these derivatives were synthesized via the corresponding nitro derivatives.

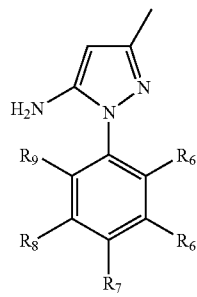

| amino pyrazoles Nr. | $R_5$ | $R_6$ | $R_7$ | $R_8$ | $R_9$ |
|---|---|---|---|---|---|
| 5 | H | $SO_3H$ | $NH_2$ | H | H |
| 6 | H | $SO_3H$ | $OCH_3$ | H | H |
| 7 | H | $CH_3$ | $SO_3H$ | H | H |
| 8 | H | $NH_2$ | $SO_3H$ | H | H |
| 9 | H | *—S(=O)(=O)—CH$_2$CH$_2$—OH | H | H | H |
| 10 | H | H | $SO_3H$ | H | H |
| 11 | H | H | COOH | H | H |
| 12 | H | H | *—S(=O)(=O)—CH$_2$CH$_2$—OH | H | H |
| 13 | H | *—C$_6$H$_5$* | $SO_3H$ | H | H |
| 14 | $SO_3H$ | *—C$_6$H$_5$—* | | H | H |
| 15 | H | *—C$_6$H$_4$—SO$_3$H* | | H | H |
| 16 | H | *—C$_6$H$_4$—SO$_3$H* | | H | H |

TABLE 2-continued substituted amino pyrazoles Nr. 1 to 20
The following amino pyrazoles were obtained in a similar manner as described above. If the phenyl moiety is substituted by a amino group, these derivatives were synthesized via the corresponding nitro derivatives.

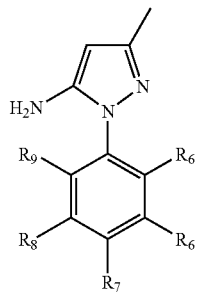

| amino pyrazoles Nr. | $R_5$ | $R_6$ | $R_7$ | $R_8$ | $R_9$ |
|---|---|---|---|---|---|
| 17 | H | | ![phenyl-SO3H] | H | H |
| 18 | H | | ![HO3S-phenyl] | H | H |
| 19 | $SO_3H$ | | ![HO3S-phenyl] | H | H |
| 20 | H | | ![HO3S-phenyl-SO3H] | H | H |

EXAMPLE

Synthesis of dye Nr. 1 (coupling product of the diazotated 2-Amino-benzthiazole-5-sulfonic acid and 1-(3'-sulfophenyl)-3-methyl-5-aminopyrazol)

To 500 g sulfuric acid (98%) 40 g sodium nitrite were added and cooled to 5° C. To the cooled solution 115 g 2-Amino-benzthiazole-5-sulfonic acid were added while adding 625 g of crushed ice to keep the temperature low. After the diazotation of the 2-Amino-benzthiazole-5-sulfonic acid has been completed, this suspension was added to a solution of 1000 ml water and 127 g 1-(3'-sulfophenyl)-3-methyl-5-aminopyrazol. The pH was rised from a pH of 0 to 1 to a pH of 5 to 6 by adding about 1330 g of a 30% NaOH solution. The mixture was stirred until the coupling was completed. The resulting dye was purified, desalted and concentrated.

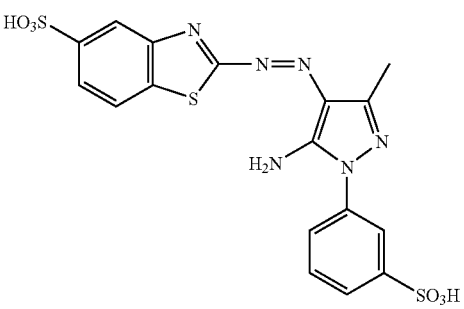

The dyestuff revealed excellent light fastness, good ozon fastness and showed a very brilliant yellow color when applied to paper. The absorbtion maximum was 449.0 nm measured in water with sodium acetat (2 g per liter).

TABLE 3 dye-Nr. 2 to dye-Nr. 42 (The absorbtion maximum were measured in water with sodium acetat (2 g per liter))
The following examples were sythesized in a similar manner as disclosed in example 1 of GB1597959

| dye-Nr. | Structure | $\lambda_{max}$ |
|---|---|---|
| 2 | | 408.3 |
| 3 | | 404.9 |
| 4 | | 427.4 |
| 5 | | 435.1 |
| 6 | | 439.7 |
| 7 | | 453.2 |

TABLE 3-continued dye-Nr. 2 to dye-Nr. 42 (The absorbtion maximum were
measured in water with sodium acetat (2 g per liter))
The following examples were sythesized in a similar
manner as disclosed in example 1 of GB1597959

| dye-Nr. | Structure | $\lambda_{max}$ |
|---|---|---|
| 8 | | 443.0 |
| 9 | | 449.2 |
| 10 | | 448.3 |
| 11 | | 452.1 |
| 12 | | 452.3 |
| 13 | | 454.2 |

TABLE 3-continued dye-Nr. 2 to dye-Nr. 42 (The absorbtion maximum were
measured in water with sodium acetat (2 g per liter))
The following examples were sythesized in a similar
manner as disclosed in example 1 of GB1597959

| dye-Nr. | Structure | $\lambda_{max}$ |
|---|---|---|
| 14 | | 452.2 |
| 15 | | 462.1 |
| 16 | | 462.4 |
| 17 | | 461.7 |
| 18 | | 463.2 |
| 19 | | 460.3 |

TABLE 3-continued dye-Nr. 2 to dye-Nr. 42 (The absorbtion maximum were
measured in water with sodium acetat (2 g per liter))
The following examples were sythesized in a similar
manner as disclosed in example 1 of GB1597959

| dye-Nr. | Structure | $\lambda_{max}$ |
|---|---|---|
| 20 | | 461.3 |
| 21 | | 465.8 |
| 22 | | 468.2 |
| 23 | | 443.7 |
| 24 | | 454.3 |

TABLE 3-continued dye-Nr. 2 to dye-Nr. 42 (The absorbtion maximum were measured in water with sodium acetat (2 g per liter)) The following examples were sythesized in a similar manner as disclosed in example 1 of GB1597959

| dye-Nr. | Structure | $\lambda_{max}$ |
|---|---|---|
| 25 | | 459.5 |
| 26 | | 453.0 |
| 27 | | 452.5 |
| 28 | | 451.8 |
| 29 | | 455.9 |
| 30 | | 459.7 |

TABLE 3-continued

*dye-Nr. 2 to dye-Nr. 42 (The absorbtion maximum were measured in water with sodium acetat (2 g per liter))*
*The following examples were sythesized in a similar manner as disclosed in example 1 of GB1597959*

| dye-Nr. | Structure | $\lambda_{max}$ |
|---|---|---|
| 31 | | 454.7 |
| 32 | | 453.2 |
| 33 | | 453.8 |
| 34 | | 472.8 |
| 35 | | 459.0 |

TABLE 3-continued dye-Nr. 2 to dye-Nr. 42 (The absorbtion maximum were measured in water with sodium acetat (2 g per liter))
The following examples were sythesized in a similar manner as disclosed in example 1 of GB1597959

| dye-Nr. | Structure | $\lambda_{max}$ |
|---------|-----------|-----------------|
| 36 | | 458.1 |
| 37 | | 457.4 |
| 38 | | 389.7 |
| 39 | | 371.8 |
| 40 | | 458.1 |
| 41 | | 442.9 |

TABLE 3-continued dye-Nr. 2 to dye-Nr. 42 (The absorbtion maximum were
measured in water with sodium acetat (2 g per liter))
The following examples were sythesized in a similar
manner as disclosed in example 1 of GB1597959

| dye-Nr. | Structure | $\lambda_{max}$ |
|---|---|---|
| 42 | (structure) | 470.3 |

EXAMPLE

Formulation of Ink-Jet Inks

A 20% solution of dyestuff example 1 was formulated to an ink-jet ink, comprising at least 2,5 wt % of dyestuff 1, and the following ingredients were added to a stirred solution:

Example 1

| | |
|---|---|
| 12.5 wt % | of 20% solution of dyestuff 1 (=2.5 wt % dyestuff 1) |
| 15.0 wt % | of N-methyl-2-pyrrolidone |
| 72.5 wt % | of water |

The ink of example 1 comprising dyestuff 1 was filtred by micro-filtration (having 0.45 micrometer pores) and was ready to use for ink jet printing.

The following formulations are used for printing materials as discribed above. Such compositions were made by the same procedure as described in formulation example 1.

Example 2

| | |
|---|---|
| 12.5 wt % | of 20% solution of dyestuff 1 (=2.5 wt % dyestuff 1) |
| 15.0 wt % | of diethyleneglycol |
| 72.5 wt % | of water |

Example 3

| | |
|---|---|
| 12.5 wt % | of 20% solution of dyestuff 1 (=2.5 wt % dyestuff 1) |
| 10.0 wt % | of N-methyl-2-pyrrolidone |
| 5.0 wt % | of diethyleneglycol |
| 72.5 wt % | of water |

Example 4

| | |
|---|---|
| 12.5 wt % | of 20% solution of dyestuff 1 (=2.5 wt % dyestuff 1) |
| 10.0 wt % | of diethyleneglycol |
| 3.0 wt % | of diethylenglycol-mono-n-butylether |
| 74.5 wt % | of water |

Example 5

| | |
|---|---|
| 12.5 wt % | of 20% solution of dyestuff 1 (=2.5 wt % dyestuff 1) |
| 10.0 wt % | of thiodiglycol |
| 5.0 wt % | of N-methyl-2-pyrrolidone |
| 72.5 wt % | of water |

Example 6

| | |
|---|---|
| 12.5 wt % | of 20% solution of dyestuff 1 (=2.5 wt % dyestuff 1) |
| 10.0 wt % | of diethyleneglycol |
| 1.0 wt % | of Emilgen 66 |
| 76.5 wt % | of water |

Example 7

| | |
|---|---|
| 12.5 wt % | of 20% solution of dyestuff 1 (=2.5 wt % dyestuff 1) |
| 5.0 wt % | of glycerol |
| 5.0 wt % | of diethyleneglycol |
| 2.0 wt % | of triethanolamine |
| 75.5 wt % | of water |

Example 8

| | |
|---|---|
| 25.0 wt % | of 10% solution of dyestuff 4 (=2.5 wt % dyestuff 4) |
| 20.0 wt % | of diethylenglycol |
| 55.0 wt % | of water |

Example 9

| | |
|---|---|
| 25.0 wt % | of 10% solution of dyestuff 4 (=2.5 wt % dyestuff 4) |
| 20.0 wt % | of 1.2 propyleneglycol |
| 55.0 wt % | of water |

Example 10

| 25.0 wt % | of 10% solution of dyestuff 4 (=2.5 wt % dyestuff 4) |
| --- | --- |
| 8.0 wt % | of diethylenglycol |
| 5.0 wt % | of glycerol |
| 1.0 wt % | of Emulgen 66 |
| 61.0 wt % | of water |

Example 11

| 12.5 wt % | of 20% solution of dyestuff 4 (=2.5 wt % dyestuff 4) |
| --- | --- |
| 10.0 wt % | of thiodiglycol |
| 5.0 wt % | of diethylenglycol |
| 72.5 wt % | of water |

Example 12

| 12.5 wt % | of 20% solution of dyestuff 4 (=2.5 wt % dyestuff 4) |
| --- | --- |
| 10.0 wt % | of thiodiglycol |
| 5.0 wt % | of 1-propanol |
| 72.5 wt % | of water |

Example 13

| 12.5 wt % | of 20% solution of dyestuff 4 (=2.5 wt % dyestuff 4) |
| --- | --- |
| 15.0 wt % | of polyethoxylated-(9)-triethanolamine |
| 72.5 wt % | of water |

Example 14

| 25.0 wt % | of 10% solution of dyestuff 7 (=2.5 wt % dyestuff 7) |
| --- | --- |
| 8.0 wt % | of diethylenglycol |
| 4.0 wt % | of diethylenglycol-mono-n-butylether |
| 3.0 wt % | of 1-propanol |
| 60.0 wt % | of water |

Example 15

| 25.0 wt % | of 10% solution of dyestuff 7 (=2.5 wt % dyestuff 7) |
| --- | --- |
| 10.0 wt % | of diethylenglycol |
| 5.0 wt % | of N-methyl-pyrrolidone |
| 60.0 wt % | of water |

Example 16

| 12.5 wt % | of 20% solution of dyestuff 11 (=2.5 wt % dyestuff 11) |
| --- | --- |
| 20.0 wt % | of diethylenglycol |
| 68.5 wt % | of water |

Example 17

| 12.5 wt % | of 20% solution of dyestuff 11 (=2.5 wt % dyestuff 11) |
| --- | --- |
| 10.0 wt % | of 1,5-pentandiol |
| 5.0 wt % | of ethylenglycol |
| 72.5 wt % | of water |

Example 18

| 25.0 wt % | of 10% solution of dyestuff 16 (=2.5 wt % dyestuff 16) |
| --- | --- |
| 15.0 wt % | of 2-[2-(2methoxyethoxy)ethoxy]-ethanol |
| 60.0 wt % | of water |

Example 20

| 25.0 wt % | of 10% solution of dyestuff 23 (=2.5 wt % dyestuff 23) |
| --- | --- |
| 10.0 wt % | of 2-diethylamino-1-ethanol |
| 5.0 wt % | of o,o-bis-(2-aminopropyl)-polyethylenglycol 500 |
| 60.0 wt % | of water |

Example 21

| 25.0 wt % | of 10% solution of dyestuff 23 (=2.5 wt % dyestuff 23) |
| --- | --- |
| 10.0 wt % | of o-(2-aminoethyl)-polyethylenglycol 750 |
| 5.0 wt % | of thiodiglycol |
| 60.0 wt % | of water |

Example 22

| 25.0 wt % | of 10% solution of dyestuff 25 (=2.5 wt % dyestuff 25) |
| --- | --- |
| 10.0 wt % | of 3-dimethylamino-1-propanol |
| 5.0 wt % | of glycerol |
| 60.0 wt % | of water |

Example 23

25.0 wt % of 10% solution of dyestuff 25 (=2.5 wt % dyestuff 25)
10.0 wt % of diethylenglycol
5.0 wt % of water

Example 24

25.0 wt % of 10% solution of dyestuff 30 (=2.5 wt % dyestuff 30)
10.0 wt % of diethylenglycol
60.0 wt % of water

Example 25

25.0 wt % of 10% solution of dyestuff 32 (=2.5 wt % dyestuff 32)
10.0 wt % of diethylenglycol
5.0 wt % of o,o-bis-(3-aminopropyl)-polyethylenglycol 1500
60.0 wt % of water

Example 26

25.0 wt % of 10% solution of dyestuff 36 (=2.5 wt % dyestuff 36)
10.0 wt % of 3-dimethylamino-1-propanol
5.0 wt % of thiodiglycol
60.0 wt % of water

Example 27

25.0 wt % of 10% solution of dyestuff 38 (=2.5 wt % dyestuff 38)
10.0 wt % of 2-(2-diethylaminoethoxy)-ethanol
5.0 wt % of glycerol
60.0 wt % of water

Example 28

| | |
|---|---|
| 25.0 wt % | of 10% solution of dyestuff 41 (=2.5 wt % dyestuff 41) |
| 10.0 wt % | of diethylenglycol |
| 1.0 wt % | of Emulgen 66 |
| 64.0 wt % | of water |

APPLICATION EXAMPLES

Each of the inks as indicated above were introduced into an HP 880C DeskJet Printer and printed onto an A4 HP Premium Inkjet paper (HP and DeskJet are registered trademarks of Hewlett-Packard, Palo Alto, Calif., USA). Different properties of the prints have been tested and the had good to excellent fastnes against ozon and light. The prints were brilliant and had a good yellow shade.

The invention claimed is:

1. A dyestuff according to the formula (I), a salt of the dyestuff, or a mixture of the dyestuffs

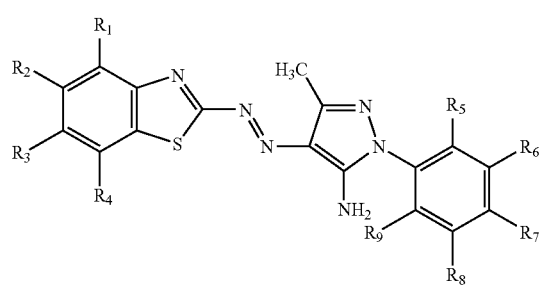

(I)

wherein
$R_1$, $R_2$, $R_3$, $R_4$, independently from each other is H, $SO_3H$, $SO_2R$, $SO_2NR'R''$, COOR, COOH, OH, alkyl, aryl, alkoxy, $NCOCH_3$, or $NR'R''$, or two neighbouring substituents $R_1$, $R_2$, $R_3$, or $R_4$ form together a ring annealed to the benzthiazole moiety and is unsubstituted or substituted by $SO_3H$ and wherein at least two of the substituents $R_1$, $R_2$, $R_3$, or $R_4$ are H;
$R_5$, $R_6$, $R_7$, $R_8$, $R_9$ independently from each other is H, alkyl, aryl, alkoxy, $SO_3H$, $NR'R''$, or two neighbouring substituents $R_5$, $R_6$, $R_7$, $R_8$, or $R_9$ form together a ring annealed to the phenyl moiety and is unsubstituted or substituted by $SO_3H$ and wherein at least two of the substituents $R_5$, $R_6$, $R_7$, $R_8$, or $R_9$ are H;
R is H, alkyl or aryl group, substituted or unsubstituted, R' and R" are independently from each other H, alkyl or alkoxy or aryl groups, substituted or unsubstituted;
with the proviso that at least one of the substituents $R_5$, $R_6$, $R_7$, $R_8$, or $R_9$ is different from H, and the compound according to the formula (I) bears at least one sulpho group, which is located in the coupling component.

2. The dyestuff according to claim 1, having the formula (I')

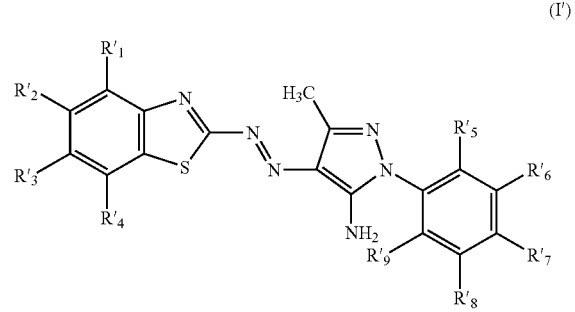

(I')

wherein
$R'_1$, $R'_2$, $R'_3$, $R'_4$, independently from each other is H, $SO_3H$, $SO_2CH_2CH_2$—OH, $SO_2NH_2$, $SO_2N(CH_3)_2$ COOH, $COOCH_3$, $COOCH_2CH_3$, $CH_3$, $CH_2CH_3$, $OCH_2CH_2OH$, $NCOCH_3$, $N(CH_3)_2$ or $NH_2$, or two neighbouring substituents $R'_1$, $R'_2$, $R'_3$, or $R'_4$ form together a six membered ring annealed to the benzthiazole moiety and is unsubstituted or substituted by $SO_3H$ and wherein at least two of the substituents $R'_1$, $R'_2$, $R'_3$ or $R'_4$ are H;
$R'_5$, $R'_6$, $R'_7$, $R'_8$, $R'_9$ independently from each other is H, methyl, ethyl, aryl, methoxy or ethoxy, $SO_3H$, $NH_2$, or two neighbouring substituents $R'_5$, $R'_6$, $R'_7$, $R'_8$, or $R'_9$ form together a six membered ring annealed to the phenyl moiety and is unsubstituted or substituted by $SO_3H$; and wherein at least one of the $R'_5$, $R'_6$, $R'_7$, or $R'_8$, are H;
with the proviso that at least one of the substituents $R'_5$, $R'_6$, $R'_7$, $R'_8$ or $R'_9$ is different from H and the compound according to the formula (I) is substituted by at least one solubilising group which is located in the coupling component.

3. The dyestuff according to claim 1 wherein $R_9$ is H.

4. A dyestuff according to formula (I"), a salt of the dyestuff according to formula (I"), or a mixture of dyestuffs of formula (I")

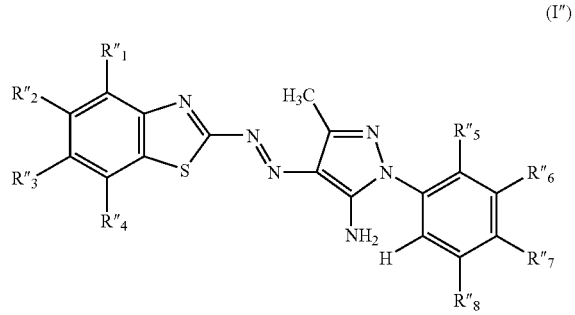

(I")

wherein
$R''_1$, $R''_2$, $R''_3$, $R'_4$, independently from each other are H, $SO_3H$, $SO_2CH_2CH_2$—OH, $SO_2NH_2$, $SO_2N(CH_3)_2$ COOH, $COOCH_3$, $COOCH_2CH_3$, $CH_3$, $CH_2CH_3$, $OCH_2CH_2OH$, $NCOCH_3$, $N(CH_3)_2$ or $NH_2$, or two neighbouring substituents $R''_1$, $R''_2$, $R''_3$, or $R''_4$ form together a six membered ring annealed to the benzthiazole moiety and is unsubstituted or substituted by SO₃H, and wherein at least two of the substituents R''₁, R''₂, R''₃ or R''₄ are H;

R''₅, R''₆, R''₇, R''₈, R''₉ independently from each other is H, methyl, ethyl, aryl, methoxy or ethoxy, SO₃H, SO₂CH₂CH₂—OH, NH₂, and two neighbouring substituents R''₅, R''₆, R''₇, R''₈, or R''₉ form together a six membered ring annealed to the phenyl moiety and is unsubstituted or substituted by SO₃H; and wherein at least one of the R''₅, R''₆, R''₇, or R''₈ is H; wherein the six membered ring annealed to the phenyl has one of the following formulas:

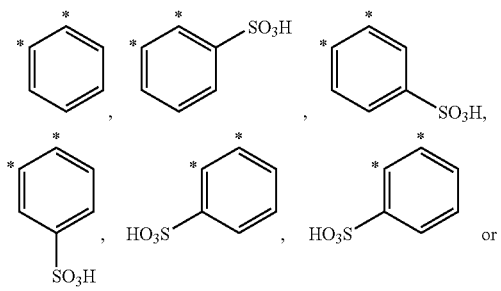

-continued

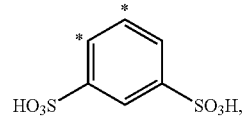

wherein the asterisk is the point of attachment to the phenyl.

5. An ink jet printing ink or a printing paste or a liquid dyeing preparation comprising at least one, dyestuff, a salt of the dyestuff, or a mixture of the dyestuffs according to claim 1.

6. A method for dyeing or printing or ink jet printing an organic substrate, comprising the step of contacting the organic substrate with at least one dyestuff, a salt of the dyestuff, or a mixture of the dyestuffs according to claim 1.

7. A method according to claim 6 wherein the organic substrate is paper or a papery substrate.

8. An organic substrate dyed or printed with at least one dyestuff, a salt of the dyestuff, or a mixture of the dyestuffs according to claim 1.

9. The dyed or printed substrate according to claim 8 wherein the organic substrate is paper or a papery substrate.

* * * * *